United States Patent
Biermann et al.

[19]

[11] Patent Number: 6,018,461
[45] Date of Patent: Jan. 25, 2000

[54] PC CARD WITH INTERNAL EMI SHIELDING

[75] Inventors: Werner Biermann, Winterbach, Germany; Iain Thomas Learmonth, Basingstoke, United Kingdom; Jan Zeyfang, Leutenbach, Germany

[73] Assignee: ITT Manufacturing Enterprises, Inc., Wilmington, Del.

[21] Appl. No.: 09/041,482

[22] Filed: Mar. 12, 1998

[30] Foreign Application Priority Data

Mar. 13, 1997 [DE] Germany ............. 197 10 514

[51] Int. Cl.[7] ................. H05K 7/14; H05K 9/00
[52] U.S. Cl. ............. 361/737; 361/800; 361/818; 174/35 R
[58] Field of Search ............. 361/736, 737, 361/752, 796, 799, 800, 816, 818; 257/660, 724, 728; 174/35 R, 35 GC, 51; 439/607, 608, 609

[56] References Cited

U.S. PATENT DOCUMENTS

| | | | |
|---|---|---|---|
| 4,399,487 | 8/1983 | Neumann | 361/727 |
| 5,252,782 | 10/1993 | Cantrell | 174/35 R |
| 5,335,147 | 8/1994 | Weber | 361/818 |
| 5,414,597 | 5/1995 | Lindland et al. | 361/816 |
| 5,513,074 | 4/1996 | Ainsbury | 361/737 |
| 5,847,938 | 12/1998 | Gammon | 361/816 |

*Primary Examiner*—Leo P. Picard
*Assistant Examiner*—Jayprakash N. Gandhi
*Attorney, Agent, or Firm*—Thomas L. Peterson

[57] ABSTRACT

A PC card is provided with internal electromagnetic shielding to isolate two or more different circuit component areas of the card, which facilitates mounting of the shielding. In one card which is an extended card having a standard forward portion (102) containing electronic components, and having an extended rearward portion containing an antenna (100) for radiating electromagnetic energy, the shielding includes a strip-shaped portion (22) of electrically conductive material that extends across the width of the circuit board and that has opposite ends that terminate near the intersection between the two card parts, with the shielding having pins (31) that project into holes (150) in the circuit board. In another PC card a plate-like filler (38, 39) which lies between the circuit board (151) and a sheet metal cover part, has a plurality of holes (41–47), and strip-like shielding (21') extends around the periphery of the hole and is mounted thereat to the filler, with the shielding extending above and below the filler and contacting the sheet metal cover part and the circuit board.

11 Claims, 3 Drawing Sheets

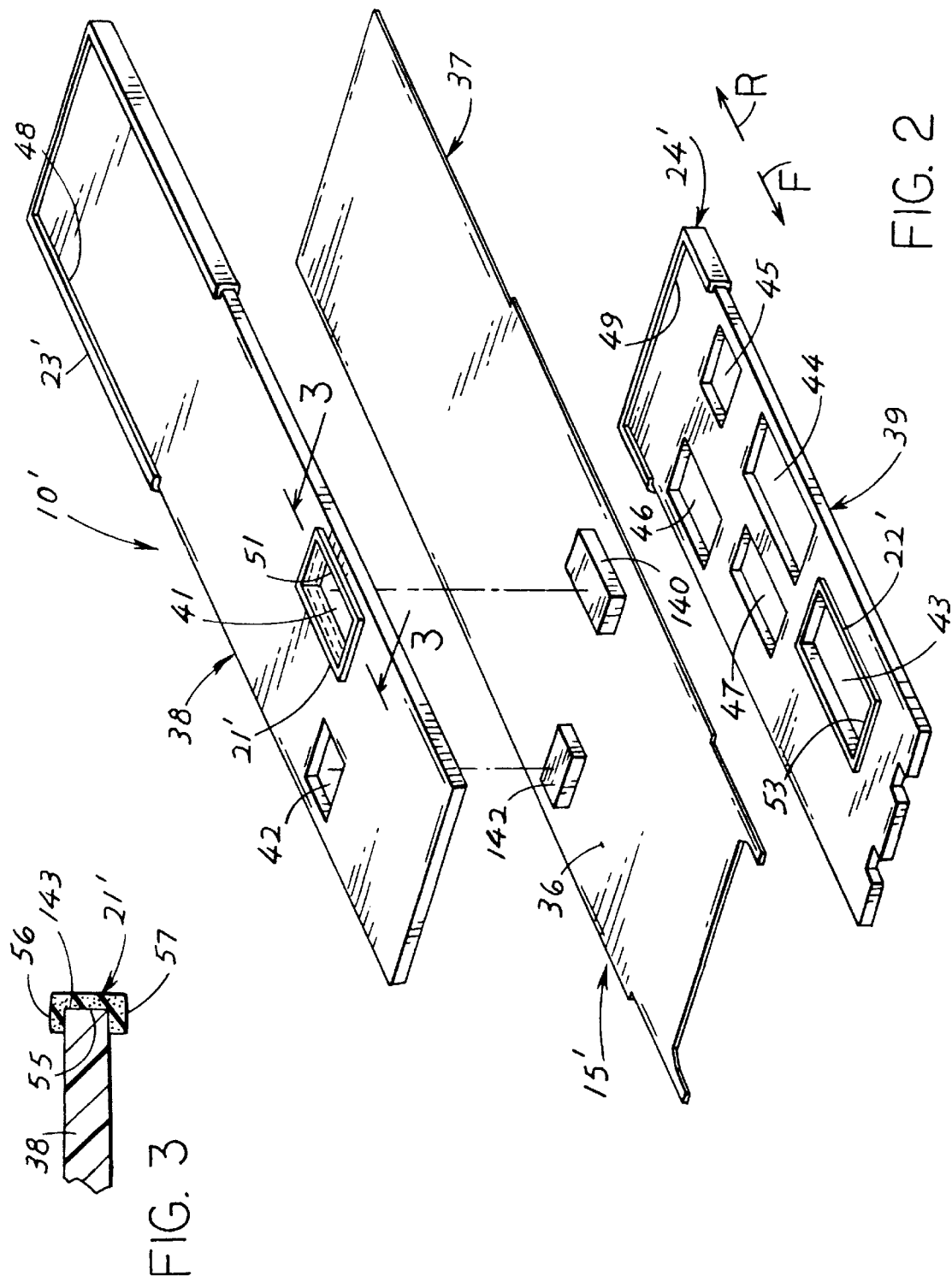

PC CARD WITH INTERNAL EMI SHIELDING

BACKGROUND OF THE INVENTION

PC cards, also known as data cards or IC cards, are available according to standards of the PCMCIA (Personal Computer Memory Card International Association). Present standards specify that the card is 54 mm wide and 85.6 mm long, and with a 68-contact connector at the front end. Different thicknesses are specified, with the most common card being the Type II card which has a maximum thickness of 5 mm. Extended length PC cards are available, which project rearward of a standard card-receiving slot, with the first 10 mm extension being no thicker or wider than that of a standard PC card.

PC cards in general use have sheet metal covers surrounding a circuit board to prevent components in the card from picking up stray electromagnetic energy. As higher frequency signals are processed, there is increasing problems of cross-talk between different electronic circuit components on the circuit board. It is possible to form grooves in the circuit board around the components and to place an electrically conductive gasket that conforms to the grooves and that is compressed between the circuit board and a metal cover. However, any gasket or other shield must be formed so it can be easily installed. It should be noted that the parts of PC cards are commonly mass produced by a component manufacturer who sells them to smaller card makers. The card maker designs a circuit for a circuit board, forms traces on the board and drill holes in the board, mounts circuit components on the board at the traces, and assembles the parts into a complete card. Any internal electromagnetic shielding should enable the card maker to easily mount the shielding.

SUMMARY OF THE INVENTION

In accordance with one embodiment of the present invention, a PC card is provided with electromagnetic shielding within the card for isolating at least two separate card areas from each other, which facilitates placement and mounting of the shielding by a card maker. The shielding includes strip-shaped portions of electrically conductive material that lie between and against a surface of the circuit board such as its upper face and also against an inner surface of the sheet metal cover of the card. Means for preventing horizontal movement of the shield along the circuit board face are constructed to facilitate installation by the card maker whose primary function is to design and install circuit components and card parts purchased from manufacturers.

One means for preventing horizontal movement of the shield includes a plate-like filler that has a plurality of holes, with each hole lying around one of the electronic components that are mounted on the circuit board. A shield element extends along the periphery of each filler hole and projects both above and below the plate-like filler. This enables each shield to press against the circuit board at locations around the component and to also press against the sheet metal cover. The plate-like filler is horizontally fixed with respect to the circuit board, and is constructed of material which is easily machined.

One type of PC card that is an extended PC card, includes an extension with an antenna for radiating electromagnetic energy. The shielding is in the form of a strip that extends across the width of the circuit board and lies between the extension and the standard part of the PC card to shield components within the standard part of the PC card from radiation emitted by the antenna on the extended part. The strip can be mounted by pins that project into drilled holes in the circuit board.

The novel features of the invention are set forth with particularity in the appended claims. The invention will be best understood from the following description when read in conjunction with the accompanying drawings.

BRIEF DESCRIPTION OF THE DRAWINGS

FIG. 2 is an exploded isometric view of a PC card constructed in accordance with another embodiment of the invention.

FIG. 3 is a view taken on line III—III of FIG. 2.

DESCRIPTION OF THE PREFERRED EMBODIMENTS

Figure 1:
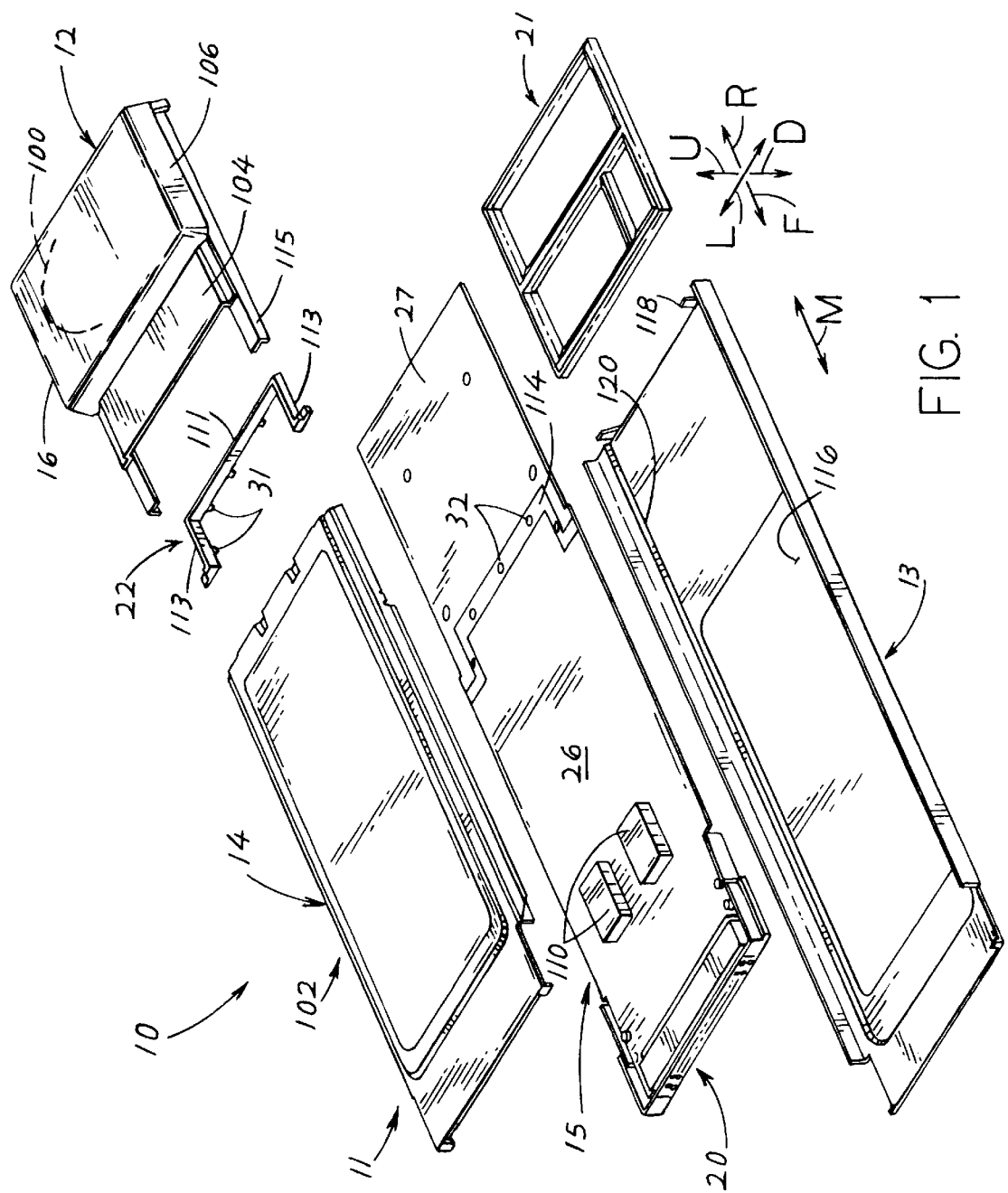
FIG. 1 is an exploded isometric view of a PC card of an extended type, constructed in accordance with the present invention.

FIG. 1 illustrates an extended PC card 10 which includes an elongated cover 11 with lower and upper sheet metal cover parts 13, 14. A circuit board 15 lies between the cover parts and a front connector 20 lies at the front end of the circuit board. While the lower cover part 13 lies under the entire length of the circuit board in a longitudinal direction M the upper cover half 14 is shorter and lies only over a main circuit board region 26. An antenna extension 12 lies over an extension region 27 of the circuit board. While the lower and upper cover parts 13, 14 are formed of sheet metal, the antenna extension 12 has a cover portion 16 formed of nonconductive material such as a plastic. This is because an antenna 100 lies within the antenna extension 12, and radiates and receives electromagnetic energy, to communicate with other electronic devices through radio waves.

The assembled card has a front portion 102 which is constructed in accordance with PCMCIA standards for a Type II card, which has a width in lateral direction L of 54 mm, a length in longitudinal M directions F, R of about 86 mm, and a thickness in directions U, D of no more than 5 mm. The cover half 14 covers that part of the card. The extension 12 includes a part 104 of 10 mm length, as required by PCMCIA standards, and a rearmost part 106 that includes the antenna 100 and that the standards allow to have any length, width, and height. The antenna lies on an extension region 27 of the circuit board, while electronic circuit components such as 110 lie on the main circuit board region 26 that lies under the cover part 14.

Applicant provides an electromagnetic shield 22 to isolate circuit components 110 on the main board region 26 from electromagnetic waves generated at the extension region 27. The shield 22 is in the form of a strip that extends across substantially the entire width (at least 90% of the width) of the circuit board. The strip has a laterally-extending part III and has forwardly extending sides 113 to allow holders 115 on the extension to mount on the sides of the circuit board. The sides 113 extend longitudinally by less than half or even one-quarter the longitudinal length of the circuit board. The circuit board has an electrically grounded trace 114 and has holes 32 that have been drilled into the board. The electrical shield 22 has studs or pins 31 that project into the bores 32 to prevent horizontal shifting (in directions F, R or L). A second electrical shield 21 is provided, which is of electrically conductive material and which lies under the extension region 27 of the circuit board. The shield 21 prevents electromagnetic energy emitted by the antenna 100 from reflecting off the lower cover part 13 and reaching the components 110 or additional components lying on the lower face of the circuit board region 26. It is noted that the lower cover part 13 has an upward projection at 116 and it plus tabs 118 at the opposite sides 120 of the lower cover part prevent horizontal movement of the second electrical shield 21.

Figure 4:
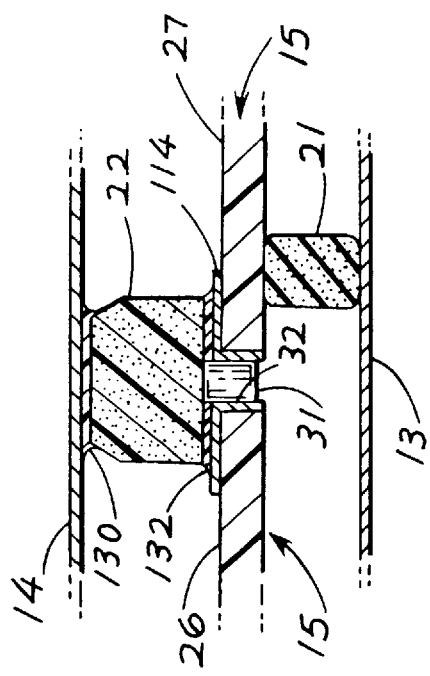
FIG. 4 is a sectional view of the electromagnetic shield of FIG. 1.

FIG. 4 is a sectional view of a portion of the PC card of FIG. 1 in an assembled condition. The strip-shaped first electrical shield 22 is shown as formed of plastic impregnated with electrically conductive particles such as silver to make the shield electrically conductive. The conductive adhesive portions at 130, 132 mechanically and electrically connect the first shield to the upper cover part 14 and to the ground trace 114 on the circuit board 15. The pins 31 provide additional stability. FIG. 4 also shows a portion of the second shield 21, which is shown as constructed of elastomeric or rubber-like material that has been impregnated with conductive particles such as silver to make it electrically conductive. The second shield 21 is slightly elastically compressed between the circuit board portion 27 and the lower cover part 13. It is noted that each of the covers 13, 14 are usually electrically connected to ground traces on the circuit board. Thus, while it may be desirable to connect each shield to a grounded trace on the circuit board, this is not necessary so long as the shield contacts the otherwise-grounded sheet metal cover.

The card maker purchases the components illustrated in FIG. 1, except for the circuit board 15 which the card maker customizes for his particular card. The card maker then assembles the components to construct the final card. The card maker generally has facilities for plating the board to form conductive traces including the ground trace 114, and to drill holes such as the holes 32. The card maker also applies the conductive adhesive shown at 130, 132 in FIG. 4. It is noted that the first shield 22 could be formed of elastomeric material that would be at least slightly compressed, so the conductive adhesive might not be required.

FIG. 2 illustrates portions of an extended PC card 10' which is similar to that of FIG. 1, except that it includes a different electromagnetic shield arrangement. The shield arrangement includes upper and lower plate-shaped filler elements 38, 39. Each filler element such as 38, has holes or apertures 41–47 for receiving circuit components such as 140, 142. A strip-shaped shield element 21' extends along the periphery of each aperture. As shown in FIG. 3, the cross-section of the strip-shaped shield element 21' is of U-shape, with a horizontal groove 55 for receiving an edge 143 of the hole in the plate-like filler element 38, and with upper and lower ends 56, 57. The element 21' is formed of electrically conductive elastomeric material, with the lower end 57 being slightly deformed and pressing against the upper face of the circuit board, and with the upper end 56 being slightly compressed and pressing against the sheet metal upper cover part (14 in FIG. 1). The strip-shaped conductive shield elements include elements 23' 24' lying at the rear ends 48, 49 of the upper and lower filler element 39.

The lower filler element is shorter than the upper one, so it does not lie under the antenna. The lower shield element 24' extends across the entire width of the lower filler element 39 and across substantially the entire width of the circuit board 15'. The shield element 24' also extends slightly forward F along opposite sides of the filler element and along opposite sides of the circuit board to aid in mounting. The shield element 23' of the upper filler element extends along the rear periphery of the upper filler element 38 and the circuit board.

Although the use of the plate-like filler elements 38, 39 results in the need for the card maker to form the holes 41–47, these holes do not have to be precisely positioned, but only lie at least about 2 mm around each component (to allow mounting of the shield element 21'). The shield element 21' can be cut from a long extruded strip.

Figure 5:
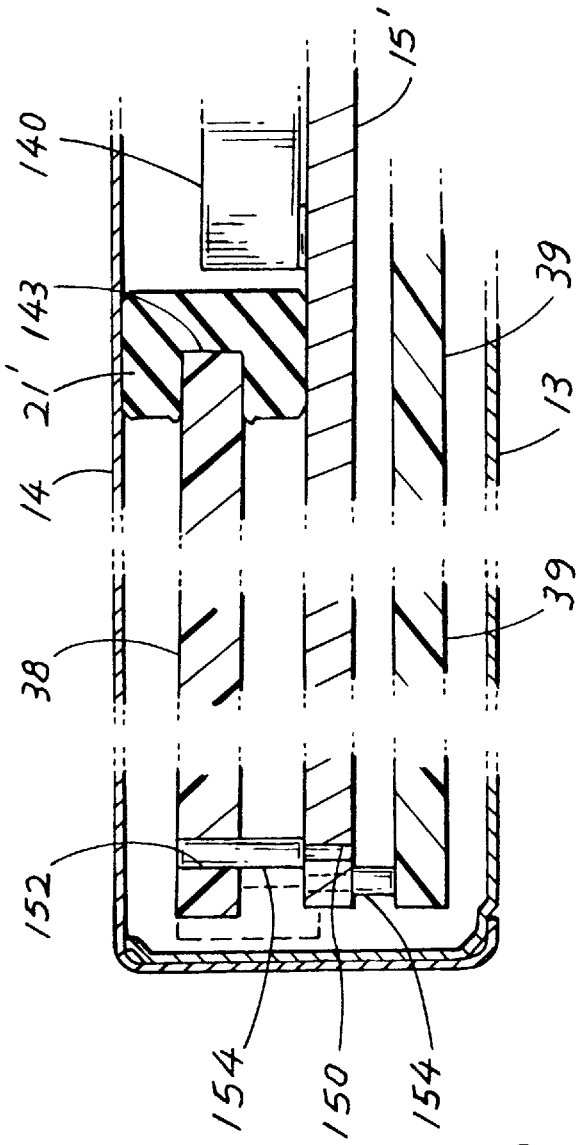
FIG. 5 is a sectional view of a side of the assembled PC card of FIG. 2.

FIG. 5 shows ways in which the filler elements 38, 39 are laterally positioned. A simple way is to form holes 150, 152 in the circuit board and in the filler element, and to install posts 154 that extend between them. As shown in phantom lines, the filler elements can be positioned against the side edges 156 of the circuit board and/or the inner surfaces 158 of the sheet metal cover.

Although terms such as "upper" and "lower" have been used to describe the invention as illustrated, it should be understood that the PC card can be used in any orientation with respect to the Earth.

Thus, the invention provides a PC card with internal electromagnetic shielding that extends between the circuit board and a sheet metal cover of the card, wherein the shielding has means for preventing its horizontal movement which enables easy mounting by a card maker who has limited facilities. In one PC card the shield is formed with pins, and a circuit board can be prepared by merely drilling holes to receive the pins. In another arrangement, a plate-like filler lies over the circuit board and has a plurality of holes that each surrounds a component region on the card on which a circuit component is mounted. Strip-like shield elements extend along the periphery of each hole, with each shield element extending above and below the plate-like filler. In an extended standard PC card which has a highly radiating portion at the extension, such as an antenna, a strip-shaped shield can extend across the width of the circuit board between the extension and the standard part of the card, with there not being a need for the shield to extend all the way or even most of the way towards the front end of the circuit board.

Although particular embodiments of the invention have been described and illustrated herein, it is recognized that modifications and variations may readily occur to those skilled in the art, and consequently, it is intended that the claims be interpreted to cover such modifications and equivalents.

What is claimed is:

1. A PC card comprising:

a circuit board with front and rear ends;

at least one circuit component mounted on and lying over a component region of said circuit board;

a front connector lying at the front end of said circuit board;

a sheet metal cover with upper and lower parts that lie respectively above and below said circuit board;

an electromagnetic shield of electrically conductive material which at least partially surrounds an area lying over said component region of said circuit board, wherein:

said PC card is an extended PC card that includes a PCMCIA standard card part having a lateral width of about 54 mm and a length in forward-rearward directions of about 86 mm, and an extension that extends rearward of said standard part, with said extension including an antenna for radiating electromagnetic energy, with said circuit board extending along said standard card part and along said extension and having an intermediate region lying between them;

upper and lower electromagnetic screens that each includes a strip-shaped portion of electrically conductive material that extends vertically between said circuit board and one of said cover parts and that extends laterally across substantially the entire lateral width of said circuit board at said intermediate region.

2. The PC card described in claim 1 wherein:

said intermediate region of said circuit board has a plurality of primarily laterally-spaced mount holes;

said strip-shaped portion of said screen includes a plurality of projections that project into said mount holes.

3. The PC card described in claim 1 wherein:

one of said shields that extends between said circuit board and said cover upper part, is in the form of a strip with opposite ends, with said opposite ends each closer to said intermediate region of said circuit board than to said front connector, to minimize the space taken by said one of said shields.

4. A PC card which includes a circuit board with front and rear ends, at least a first circuit component mounted on and lying over a first component region of said circuit board, a front connector at the front of said circuit board, a sheet metal cover with upper and lower parts that lie respectively above and below said circuit board, and a first electromagnetic shield of electrically conductive material which at least partially surrounds an area lying over said first component region of said circuit board, including:

an upper primarily plate-shaped filler lying between said circuit board and said cover upper part, with said filler having a first component receiving hole, and with said first component lying on said circuit board and within said component-receiving hole;

said first shield extends largely within said first hole, along the periphery of said first hole, with said first screen extending both above and below said filler element.

5. A PC card which includes a circuit board with longitudinally-spaced front and rear ends and primarily flat upper and lower faces, a plurality of spaced electronic circuit components mounted on each of a plurality of corresponding component regions of said circuit board, a front connector at the front end of said circuit board, and a sheet metal cover with upper and lower parts that lie respectively above and below said circuit board, comprising:

an electromagnetic shield of electrically conductive material having portions that each at least partially surrounds an area lying over one of said plurality of said component regions;

said shield being formed of electrically conductive material and having upper and lower ends, said shield upper end lying against said cover upper part and said shield lower end lying against said circuit board upper face;

means for preventing horizontal movement of said shield along said circuit board upper face;

said circuit board has opposite sides;

said means for preventing horizontal movement includes a plate-like filler lying over said circuit board and coupled to said circuit board opposite sides;

said plate-like filler has a plurality of holes that each lies around one of said component regions of said circuit board;

said shield includes a plurality of shield elements, each extending along the periphery of each of said holes.

6. A PC card which includes a circuit board with longitudinally-spaced front and rear ends and primarily flat upper and lower faces, a plurality of spaced electronic circuit components mounted on each of a plurality of corresponding component regions of said circuit board, a front connector at the front end of said circuit board, and a sheet metal cover with upper and lower parts that lie respectively above and below said circuit board, comprising:

an electromagnetic shield of electrically conductive material having portions that each at least partially surrounds an area lying over one of said plurality of said component regions;

said shield being formed of electrically conductive material and having upper and lower ends, said shield upper end lying against said cover upper part and said shield lower end lying against said circuit board upper face;

means for preventing horizontal movement of said shield along said circuit board upper face;

said plurality of components includes an antenna lying at the rear of said circuit board and a second circuit component lying forward of said antenna;

said shield is in the form of a strip that extends across the width of said circuit board, between said antenna and said second component, with said strip having free opposite ends that extend longitudinally by less than half the length of said circuit board between its ends.

7. A PC card which includes a circuit board with longitudinally-spaced front and rear ends and primarily flat upper and lower faces, a plurality of spaced electronic circuit components mounted on each of a plurality of corresponding component regions of said circuit board, a front connector at the front end of said circuit board, and a sheet metal cover with upper and lower parts that lie respectively above and below said circuit board, comprising:

an electromagnetic shield of electrically conductive material having portions that each at least partially surrounds an area lying over one of said plurality of said component regions;

said shield being formed of electrically conductive material and having upper and lower ends, said shield upper end lying against said cover upper part and said shield lower end lying against said circuit board upper face;

means for preventing horizontal movement of said shield along said circuit board upper face;

said PC card is an extended PC card that includes a PCMCIA standard card part having a lateral width of about 54 mm and length in inward-rearward directions of about 86 mm, and an extension that extends rearward of said standard part, with said extension including an antenna for radiating electromagnetic energy, with said circuit board extending along said standard card part and along said extension and having an intermediate region lying between them.

8. A PC card which includes a circuit board with longitudinally-spaced front and rear ends and primarily flat upper and lower faces, a plurality of spaced electronic circuit components mounted on each of a plurality of corresponding component regions of said circuit board, a front connector at the front end of said circuit board, and a sheet metal cover with upper and lower parts that lie respectively above and below said circuit board, comprising:

an electromagnetic shield of electrically conductive material having portions that each at least partially surrounds an area lying over one of said plurality of said component regions;

said shield being formed of electrically conductive material and having upper and lower ends, said shield upper end lying against said cover upper part and said shield lower end lying against said circuit board upper face;

means for preventing horizontal movement of said shield along said circuit board upper face;

said means for preventing movement of said shield comprises a plate-like filler that has a plurality of holes that each lies around one of said component regions, and said electromagnetic shield comprises a plurality of separate strips that each extends within and about one of said holes.

9. A PC card which includes a circuit board with longitudinally-spaced front and rear ends and primarily flat upper and lower faces, a plurality of spaced electronic circuit components mounted on each of a plurality of corresponding component regions of said circuit board, a front connector at the front end of said circuit board, and a sheet metal cover with upper and lower parts that lie respectively above and below said circuit board, comprising:

an electromagnetic shield of electrically conductive material having portions that each at least partially surrounds an area lying over one of said plurality of said component regions;

said shield being formed of electrically conductive material and having upper and lower ends, said shield upper end lying against said cover upper apart and said shield lower end lying against said circuit board upper face;

means for preventing horizontal movement of said shield along said circuit board upper face;

said shield being formed of an electrically conductive material which consists primarily of a polymer, and said shield extends between said cover upper part and said circuit board upper face and is bonded to at least one of them.

10. The PC card described in claim 9 wherein:

said shield is formed substantially entirely of elastomeric material and is compressed between said cover upper part and said circuit board.

11. A PC card which includes a circuit board with longitudinally-spaced front and rear ends and primarily flat upper and lower faces, first and second spaced electronic circuit components mounted respectively on first and second component regions of said circuit board, a front connector at the front end of said circuit board, and a sheet metal cover with upper and lower parts that lie respectively above and below said circuit board, comprising;

upper and lower electromagnetic shields that are each formed of electrically conductive material with each shield having a part lying between said first and second component regions;

said upper shield lying between said upper face of said circuit board and said cover upper part, and said lower shield lying between said lower face of said circuit board and said cover lower part.

* * * * *